United States Patent
Joeressen

(10) Patent No.: US 7,039,031 B1
(45) Date of Patent: May 2, 2006

(54) INTEGRATING COMMUNICATIONS NETWORKS

(75) Inventor: Olaf Joeressen, Dusseldorf (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/555,701

(22) PCT Filed: Dec. 3, 1998

(86) PCT No.: PCT/IB98/02032

§ 371 (c)(1),
(2), (4) Date: Aug. 10, 2000

(87) PCT Pub. No.: WO99/29126

PCT Pub. Date: Jun. 10, 1999

(30) Foreign Application Priority Data

Dec. 3, 1997 (GB) .................................... 9725659

(51) Int. Cl.
*H04Q 7/20* (2006.01)
*H04Q 7/24* (2006.01)
*H04B 7/212* (2006.01)

(52) U.S. Cl. ................... 370/337; 370/338; 370/442; 455/437

(58) Field of Classification Search ........ 370/331–342, 370/352–389, 401–466; 455/426–436, 439–513; 709/217–227, 230
See application file for complete search history.

(56) References Cited

U.S. PATENT DOCUMENTS

| 5,265,150 | A | * | 11/1993 | Helmkamp et al. .......... 455/555 |
| H1641 | H | * | 4/1997 | Sharman ...................... 370/338 |
| 5,657,317 | A | * | 8/1997 | Mahany et al. .............. 370/338 |
| 5,697,055 | A | * | 12/1997 | Gilhousen et al. .......... 455/436 |
| 5,848,359 | A | * | 12/1998 | Furtaw ........................ 455/447 |
| 5,870,673 | A | * | 2/1999 | Haartsen ................... 455/426.1 |
| 5,960,344 | A | * | 9/1999 | Mahany .................... 455/432.2 |
| 6,112,088 | A | * | 8/2000 | Haartsen ...................... 455/437 |
| 6,590,928 | B1 | * | 7/2003 | Haartsen ...................... 375/134 |

FOREIGN PATENT DOCUMENTS

| EP | 0681406 | 11/1995 |
| EP | 0711088 | 5/1996 |
| WO | 9641491 | 12/1996 |

* cited by examiner

*Primary Examiner*—Man U. Phan
(74) *Attorney, Agent, or Firm*—Banner & Witcoff, Ltd.

(57) ABSTRACT

A terminal for simultaneously operating in a first mobile radio communications network and a second different radio communications network. The terminal comprises: first radio transceiver means for transmitting and receiving in said mobile communications network and second radio transceiver means for transmitting and receiving packets in the second radio communications network. The first transceiver means is arranged such that successive transmissions by said first transceiver means in said mobile communications network are separated by a first period of time or a multiple thereof. The second transceiver means is arranged for transmitting and/or receiving an integer number of packets sequentially in the first period of time or a multiple thereof.

30 Claims, 5 Drawing Sheets

INTEGRATING COMMUNICATIONS NETWORKS

BACKGROUND OF THE INVENTION

The present invention relates to the integration of two different communications networks. It particularly relates to a terminal which can be operate simultaneously in both networks.

Existing mobile communication networks have protocols which rigidly define specific parameters. For example, the GSM, D-AMPS and PDC networks operate using time division multiplexing (TDMA). For each frequency channel, a TDMA time frame is defined. The TDMA time frame has a fixed number of time slots of fixed duration and each time slot represents a channel through which a mobile terminal and a base station communicate. A particular terminal uses a time slot to transmit a message to the base station once per time frame and the base station uses another slot to transmit a message to the particular terminal once per time frame. The TDMA time frames are cyclically repeated one after the other.

The characteristics of the time frame vary from network to network. In the GSM network, the time frame is divided into eight time slots and each frame has a duration of 60/13 ms. In the D-AMPS and PDC networks, the time frame is divided into 3 slots, and each frame has a duration of 20 ms.

Other types of radio communications networks are proposed. One such network is the Bluetooth low power radio frequency (LPRF) network described at http://www.bluetooth.com. This communications network is proposed to obviate the need for physical electrical connections between electrical devices.

It would be desirable to integrate the new or proposed communications networks with an existing communications network or networks.

BRIEF SUMMARY OF THE INVENTION

According to one aspect of the present invention there is provided a terminal in a mobile radio communications network, as claimed in claim 1.

The timing of the second radio communications network is such that the timing of the mobile communications network and the timing of the second radio communications network can be aligned. This allows the two networks to be easily integrated through the terminal.

The terminal can simultaneously operate in both networks by transmitting or receiving in one network while simultaneously transmitting or receiving in the other network.

The second transceiver means defines a super-frame having said integer number of slots and a slot allocation pattern for each connection. The allocation patterns define what each slot in the super-frame is used for. The super-frame has a finite length and is cyclically repeated. The allocation pattern has the same finite length and is repeated with the super-frame. The finite length may be fixed or variable. The allocation pattern is preferably variable. The second communications network is preferably controlled using allocation patterns by transmitting one to each of the other transceivers in the network. The slot length in the second communications network may be fixed or variable.

The terminal by defining the allocation pattern is capable of avoiding critical concurrent activities by the terminal in the first and second communication networks. This supports integration of the first and second networks, eases type approval and simplifies RF design. The critical concurrent activities may be predefined in the terminal. They are typically those activities which are difficult or impossible to handle concurrently. One example may be simultaneous transmission in both networks another may be simultaneous reception in both networks.

BRIEF DESCRIPTION OF THE SEVERAL VIEWS OF THE DRAWINGS

For a better understanding of the present invention and to understand how the same may be brought into effect, reference will now be made by way of example only to the following drawings in which.

DETAILED DESCRIPTION OF THE INVENTION

Figure 1:
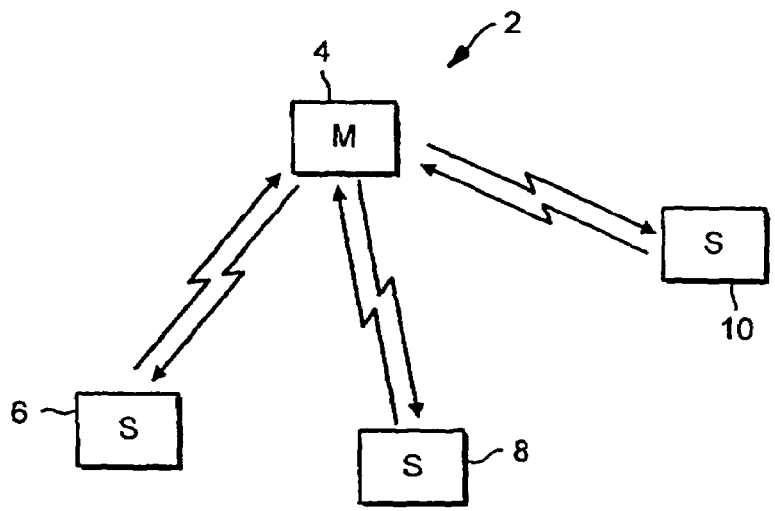
FIG. 1 illustrates an LPRF communications network including master and slave units.
Figure 2:
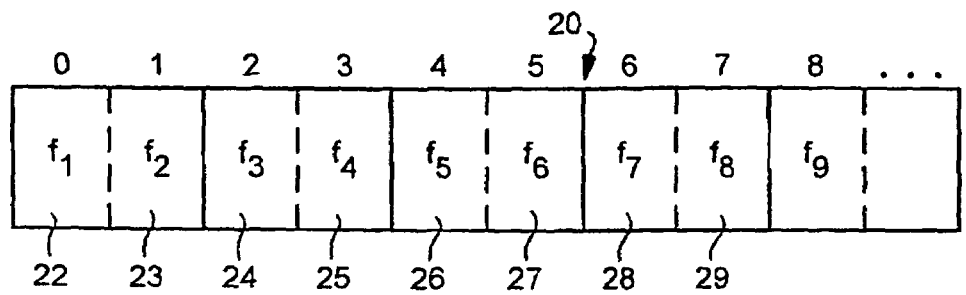
FIG. 2 illustrates the common time frame of the LPRF communications network.
Figure 3:
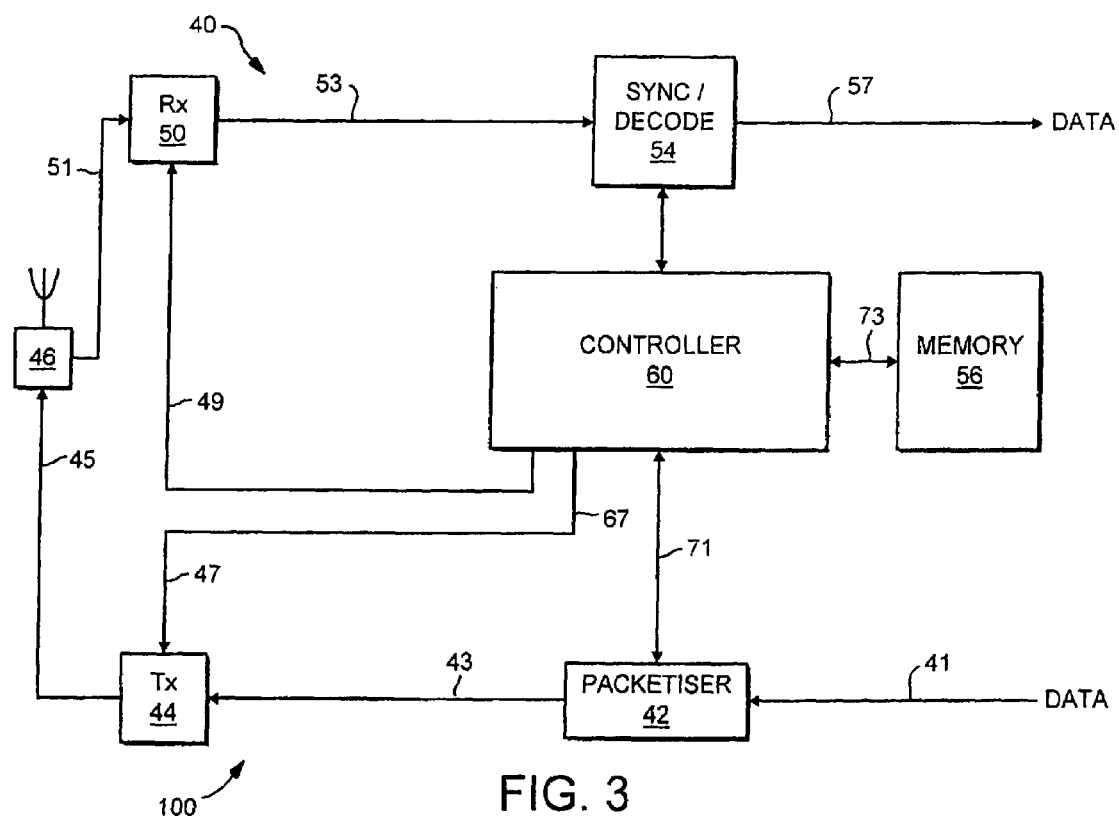
FIG. 3 illustrates a transceiver suitable for use as a master unit or a slave unit.

FIG. 1 illustrates a network 2 of radio transceiver units, including a master unit 4 and slave units 6, 8 and 10, communicating by transmitting and receiving radio packets. The master unit is the transceiver unit which initiates the connection of a slave to the network. There is only one master in a network. Referring to FIG. 3, the transceiver units are synchronised to a common time frame 20 for the network controlled by the master unit 4. This time frame consists of a series of time slots 22–29 of equal length l. Each radio packet transmitted in the network has its start aligned with the start of a slot and a single packet is transmitted in the network at a time.

When the master unit is performing point-to-point communication a transmitted radio packet is addressed to a particular transceiver which may reply to the master unit by transmitting a radio packet addressed to the master unit in a following time slot. Any time misalignment between the master and a slave is corrected by adjusting the timing of the slave so that it corresponds to that of the master unit 4.

The transceivers transmit and receive, in this example, in a microwave frequency band, illustratively 2.4 GHz. The network reduces interference by changing the frequency at which each radio packet is transmitted. A number of separate frequency channels are assigned each with a bandwidth of 1 MHz, and the frequency may hop once every time slot at a rate of f hops/s. The frequency hopping of the transceivers communicating in or joining the network is synchronised and controlled by the master unit. The sequence of hopping frequencies is unique for the network and is uniquely determined by the master unit. Although each slot is allocated a different one of a sequence of hopping frequencies it is possible for a radio packet to extend over a number of slots and in this case the frequency at which the packet is transmitted remains constant at that allocated to the slot at the start of the packet.

The network is a radio frequency network suitable for transmitting voice information or data information between transceivers. The transmissions made are of low power, for example 0 to 20 dBm, and the transceiver units can effectively communicate over the range of a few centimeters to a few tens or hundred of meters. The master unit identifies the other transceiver units within its transmission range and sets up a communication link between the master unit and that slave unit.

An allocation pattern is defined for each connection in the network. This allocation pattern defines whether a slot is used or not. If the slot is used it defines how the slot is used. Possibilities for using slots may include that a slot is:

a down-link slot (D);
an up-link slot (U);
a continuation slot (ie a slot in which the activity of the previous slot may be continued e.g. to transmit packets that extend over several slots) (C);
an unused slot (−);
a slot with the property above but fixedly reserved for a certain connection (F). Up-link is transmission from the slave unit to the master unit and down-link is transmission from the master unit to a slave unit. An example of two allocation patterns is:

| Slot No | Pattern 1 for Slave Unit 6 | Pattern 2 for Slave Unit 8 |
|---|---|---|
| 0 | D | D |
| 1 | U | U |
| 2 | DF | — |
| 3 | DCF | — |
| 4 | UF | — |
| 5 | UCF | — |

The allocation patterns have a finite length of six slots in this example and are cyclically repeated until changed. The collection of slots to which each of the allocation patterns are applied, in this case six slots, form a super-frame. The master uses radio packets to supply control information to the slave units. This control information controls the size of the super-frame and the allocation patterns for the super-frame used by each of the slave units.

In the example slave unit 6 may be active at any slot. Slots 3 and 5 are marked as continuation slots, thus packets that extend over two slots starting in slot 2 and 4 can be used. Furthermore, slots 2 to 5 are fixedly reserved for slave unit 6 providing a guaranteed capacity to this slave. Slots 0 and 1 are shared with the connection to slave unit 8. Slave unit 8 may save power by ignoring the traffic in the slots 2 to 5 completely.

Referring to FIG. 3, a schematic illustration of a transceiver unit 40 is shown. This transceiver unit may function as a slave or a master unit. Only as many functional blocks and interconnections are shown in this diagram as are necessary to explain in the following how a transceiver unit and the communication network operates. The transceiver unit 40 contains a number of functional elements including: an antenna 46, receiver 50, synchroniser/packet decoder 54, controller 60, memory 56, packetiser 42 and transmitter 44. Although these elements are shown as separate elements they may in fact be integrated together and may be carried out in software or in hardware.

Data to be transmitted in the payload of a packet by the transceiver unit 40 is supplied as data signal 41 to the packetiser 42 or as control information from the controller 60. This control information may define the length of a super-frame and the allocation pattern for the super-frame. The packetiser 42 places the data or control information into a packet 30 which is addressed to a particular unit and supplied as signal 43 to the transmitter 44. The transmitter 44 modulates a carrier wave in dependence upon the transmission frequency control signal 47 supplied by the controller. The frequency of the carrier wave is controlled to be one of a sequence of hop frequencies by the transmission frequency control signal 47, which also controls the timing of the transmission.

The antenna 46 receives a radio signal 51 and supplies it to the receiver 50 which demodulates the radio signal 51 under the control of a reception frequency control signal 49 supplied by the controller 60 to produce a digital signal 53. The digital signal 53 is supplied to the synchroniser/decoder 54. The synchroniser accepts those received radio packets addressed to the transceiver 40 and rejects those received radio packets that are not addressed to the transceiver 40. The synchroniser/decoder 54 in combination with the controller 60 synchronises the transceiver unit 40 to the time frame of the LPRF network. The controller compares the time at which a radio packet was received with the time at which the radio packet was expected to be received and shifts its timing to offset the difference. The synchroniser/decoder 54 also decodes the received packet. If the transceiver is a slave unit any control information in the packet is supplied to the controller 60 and any data in the packet is provided as data output signal 57. The control information including the length of a slot, the length of a super-frame and the pattern allocation is stored in the memory 56.

Figure 5:
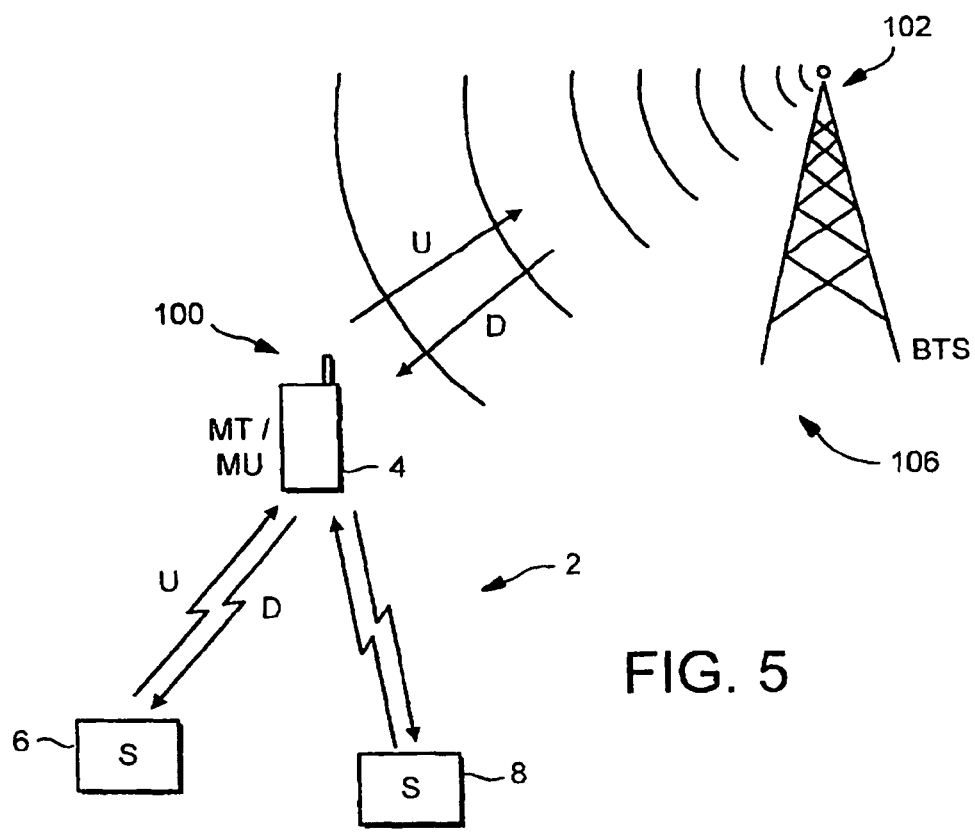
FIG. 5 illustrates the integration of a mobile communications network and an LPRF communications network via the mobile terminal of FIG. 4.

The frequency at which the transceiver 40 transmits or receives cycles or hops through a sequence of frequencies, with one hop per slot. The frequency f of the hopping is the inverse of the slot length l. The transmission frequency control signal 47 and the reception frequency control signal 49 respectively control the transmitter 44 and the receiver 50. A slave unit emulates the timing of the master unit. The sequence of frequencies through which the hopping cycles is dependent upon the master unit. The position within the cycle is dependent upon the emulated time. The transmission frequency control signal 47 and the reception frequency control signal 49 also control when and for how long the transceiver is receiving or transmitting The controller 60 in a master transceiver unit defines the allocation patterns by allocating time slots in the common LPRF time frame. It controls the slaves via transmitted control information including the allocation pattern. FIG. 5 illustrates the integration of the LPRF communications network 2 previously illustrated in FIG. 1 with a mobile radio communications network 106. The mobile network 106 comprises a base station (BTS) 102 and a plurality of mobile terminals (MT) one 100 of which is illustrated. The mobile network 106 is a conventional network such as GSM, DCS 1800, D-AMPS or PDC. The mobile terminal 100 transmits to the base station (up-link, U) and receives from the base station (down-link, D) in the manner defined by the network and known to those skilled in the art. The mobile terminal 100 also simultaneously functions as a master transceiver in the LPRF communications network 2. The mobile terminal 100 transmits to the slave units (down-link, D) and receives from the slave units (up-link, U) in the manner previously described. Thus the mobile terminal is an interface and can interact in both the mobile network 106 and the LPRF network 2.

Figure 4:
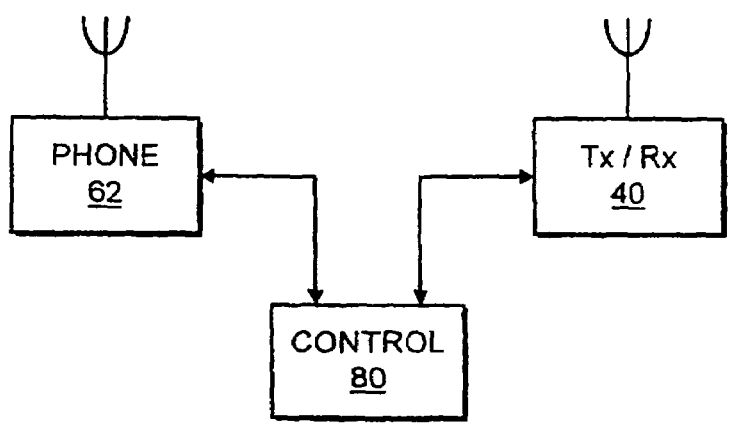
FIG. 4 illustrates a mobile terminal for simultaneously operating in two communications networks.

Referring to FIG. 4, the mobile terminal 100 is illustrated. The mobile terminal 100 has a transceiver 40 for use in the LPRF network 2, a cellular phone unit 62 which allows it to communicate in the mobile network 106 and a control unit 80. The transceiver unit 40 was previously described in connection with FIG. 3. The cellular phone unit 62 functions as a normal cellular phone and controls the activity of the terminal 100 in the network 106. The control unit 80 controls the integration of the mobile network 106 and the LPRF network 2. Although in this figure the cellular phone unit 62, the control unit 80 and the transceiver 40 are shown as separated units they may in fact share common resources such as hardware interfaces, processors especially DSP, and memory or be integrated as a single unit. Thus the controller 60 in transceiver 40 may also function as the control unit and provide resources to the phone unit 62. Resource conflict may arise in this instance and the allocation patterns for the LPRF network may be defined to avoid such conflict.

Figure 6:
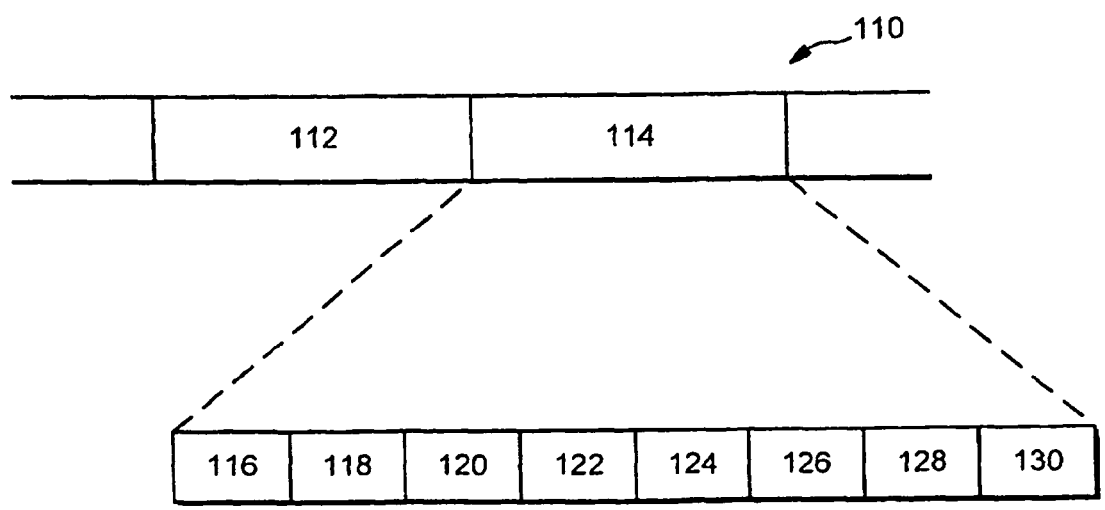
FIG. 6 illustrates the time frame used in the mobile communications network.

The mobile network 106 is typically a TDMA network. FIG. 6 illustrates the common timing system 110 used in the mobile network. The system cyclically repeats a time frame as time frames 112 and 114 etc. Each of the mobile time frames 112 and 114 are subdivided into mobile time slots 116, 118, 120 . . . 130 each having a length L. Each mobile slot is used for the transmission of a message from a mobile terminal to a base station or from a base station to a mobile terminal. The terminal 100 in the mobile network 106 will generally transmit one message and receive one message each frame. The remaining slots are used by other mobile terminals.

In the GSM network the frame size is 60/13 ms and the there are 8 time slots per frame. In the D-AMPS and PDC networks the frame size is 20 ms and there are 3 time slots per frame The LPRF slot length used by the mobile terminal 100 is chosen so that synchronisation between the mobile network and the LPRF network is possible. The length l of the LPRF time slot is chosen so that a whole number of LPRF time slots fit into one time frame of the mobile network 106 or a multiple number of such time frames. A super-frame in the LPRF network will have this whole number of slots. Consequently when a super-frame is cyclically repeated in the LPRF network, the relationship between the slots of the LPRF network and the slots of the mobile network is specified. The beginning of each super-frame is preferably aligned with the beginning of a time frame in the mobile network.

The mobile terminal may be adapted or adaptable to operate in two different mobile networks which use different mobile frame lengths. The length of the LPRF time slot is chosen so that a whole number of time slots fit into one time frame of the mobile network 106 or a multiple thereof, irrespective of the size of the time frame of the mobile network i.e. irrespective of whether it is GSM or alternatively PDC or D-AMPS.

If N LPRF time slots of size l fit into α GSM frames of size L and N' LPRF time slots of size l fit into β PDC or D-AMPS time frames of size L' then, because
L=60/13 ms and L'=20 ms:
l=(60/13)×(α/N)=(20)×(β/N')

The value l represents the size of a slot in the LPRF network. The value N represents the size of a super-frame in the LPRF network when it is integrated with a GSM mobile network. The value N' represents the size of a super-frame in the LPRF network when it is integrated with a D-AMPS or PDC mobile network. It should be appreciated that the size of the slot l may vary if for example the mobile terminal operates in a mobile network of another type with a different size of slot.

To reduce packet overhead it is preferable to have/as large as possible. It is also preferable to have an even number of LPRF time slots per mobile time frame thus allowing pairs of up-link and down-link activities.

If l is given (eg l=0.625 ms as in Bluetooth) searching for the smallest possible α,β,N',N (with even N', N) yields:
α=13,β=1,N'=32,N=96=3*N Referring to FIG. 5 the LPRF network 2 is configured to use slot lengths of this length by the mobile terminal 100. The master and slave units are configured. Referring to FIG. 4, the control unit 80 via the phone unit 62 identifies the mobile network. It then determines the value of l and the size of the super-frame, or if l is predetermined and fixed, determines the size of the super-frame. Thus the slot length used by the mobile terminal in the LPRF network may be fixed permanently or may be varied in the future when the mobile terminal moves into different mobile network environments.

The control unit also determines suitable allocation patterns for the super-frame. The allocation patterns and the super-frame size are then provided to the transceiver unit 40. This transceiver unit acts as a master unit in the LPRF network. Its activity is controlled by the parameters: super-frame size, slot length l and the allocation patterns. The master also transmits the super-frame size and allocation patterns to the slave units. The slot length/will also be transmitted if it is not fixed for the network. Thus all the units in the LPRF network have the necessary parameters to synchronise with the mobile network.

The terminal 100 acts as an interface between the mobile and LPRF networks and it operates simultaneously in both. However, concurrent activities and especially concurrent transmission by the mobile terminal 100 in the mobile network 106 and in the LPRF network 2 may cause interference and type approval difficulties. The communication of the base station 102 and the mobile terminal 100 in the mobile network is controlled by the base station. The communication of the mobile terminal (master unit) 100 with the slave units in the LPRF network is controlled by the mobile terminal (master unit) 100 as previously described. The LPRF network may be controlled by the mobile terminal acting as a master unit to maintain synchronisation of the two networks and to prevent simultaneous transmission by the mobile terminal 100 in the two networks. The controller 60 in the mobile terminal 100 can synchronise the two networks by shifting the LPRF timing relative to the mobile network. This preferably aligns the timings.

One possible algorithm for determining an allocation pattern such that the mobile terminal does not transmit simultaneously in both networks will now be described. The control unit 80 is informed by the phone unit 62 when the mobile terminal 100 will next transmit and receive in the mobile network 106. Having identified the period of next transmission by the mobile terminal in the mobile network, the control unit 80 can create an allocation pattern by allocating any LPRF time slots which are wholly or partly contemporaneous with this period to transmission by the slave units in the LPRF network, that is reception by the mobile terminal (master unit). The remaining LPRF slots are then allocated to either transmission or reception by the mobile terminal in the LPRF network. Preferably, the LPRF network and mobile network are aligned so that an LPRF time slot begins at the end of the mobile slot in which the mobile terminal transmitted in the mobile network. This LPRF slot is preferably used by the mobile terminal 100 to transmit into the LPRF network.

The master unit (mobile terminal 100) in the LPRF network may or may not be allowed to receive packets when the mobile terminal is transmitting in the mobile network.

The allocation pattern may depend upon the type and number of devices which are active as slave units in the LPRF network. Particular devices may require higher communication rates or real time communication for example.

Figure 7:
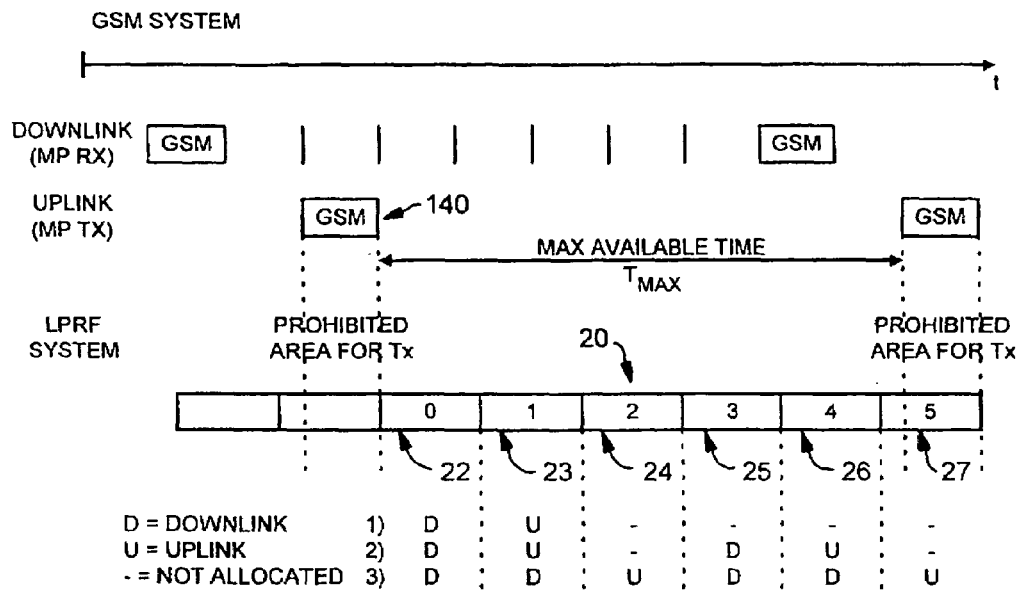
FIG. 7 illustrates the allocation of LPRF time slots in an LPRF communications network integrated with a first GSM mobile communications network.

Referring to FIG. 7, three possible allocation patterns 1), 2) and 3) made by the control unit 80 according to the above algorithm are illustrated. The mobile network is a GSM network and in these examples N=6 and l=10/12 ms. A super-frame comprises 6 LPRF time slots labelled 0 to 5 in the Figure and it spans one GSM time frame. Transmission (down-link, D) in the LPRF network by the mobile terminal during slot 5 is forbidden. In these allocations, the up-link transmission from slave to master unit immediately follows the down-link transmission from master-unit to slave. According to the first allocation, in the LPRF network the mobile terminal transmits in slot 0, receives in slot 1, and is otherwise inactive. According to the second allocation, in the LPRF network the mobile terminal transmits in slots 0 and 3 and receives in slots 1 and 4. According to the third allocation, in the LPRF network the mobile terminal transmits a packet, which extends over slots 0 and 1, and another which extends over slots 3 and 4 and receives in slots 2 and 5.

Figure 8:
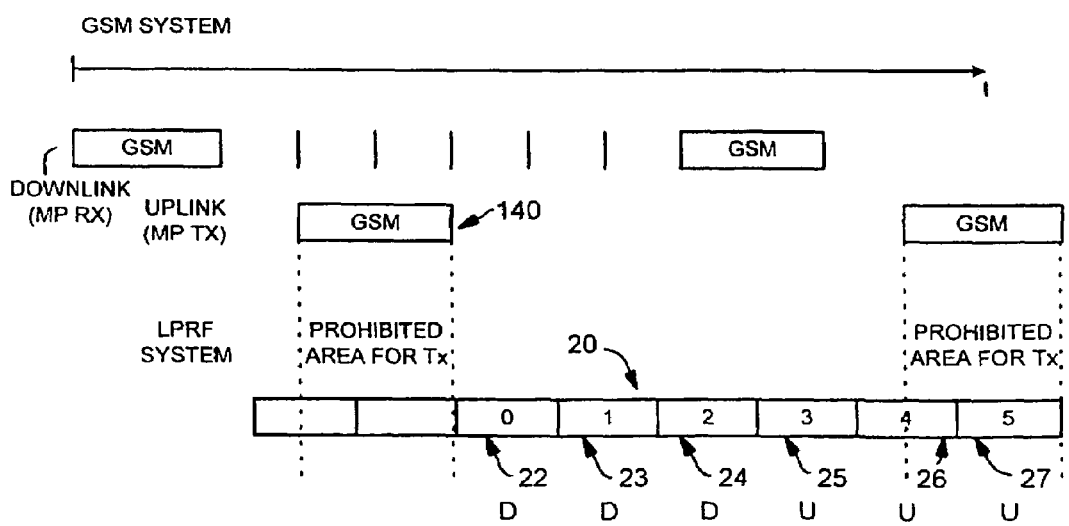
FIG. 8 illustrates the allocation of LPRF time slots in an LPRF communications network integrated with a second GSM mobile communications network.

Referring to FIG. 8, another allocation made by the control unit 80 is illustrated. The mobile network is a GSM High Speed Circuit Switched Data (HSCSD) 2+2 network and the number of LPRF time slots per GSM time frame is six labelled 0 to 5 in the Figure. In this allocation, the up-link transmission from an addressed slave to the master unit follows two LPRF time slots after the down-link transmission from master unit addressing that slave. Three separate slave units are addressed in slots 0, 1 and 2. Transmission (down-link, D) in the LPRF network by the mobile terminal during slots 4 and 5 is forbidden. In the allocation, in the LPRF network the mobile terminal transmits in slots 0, 1 and 2 and receives in slots 3, 4 and 5.

Figure 9:
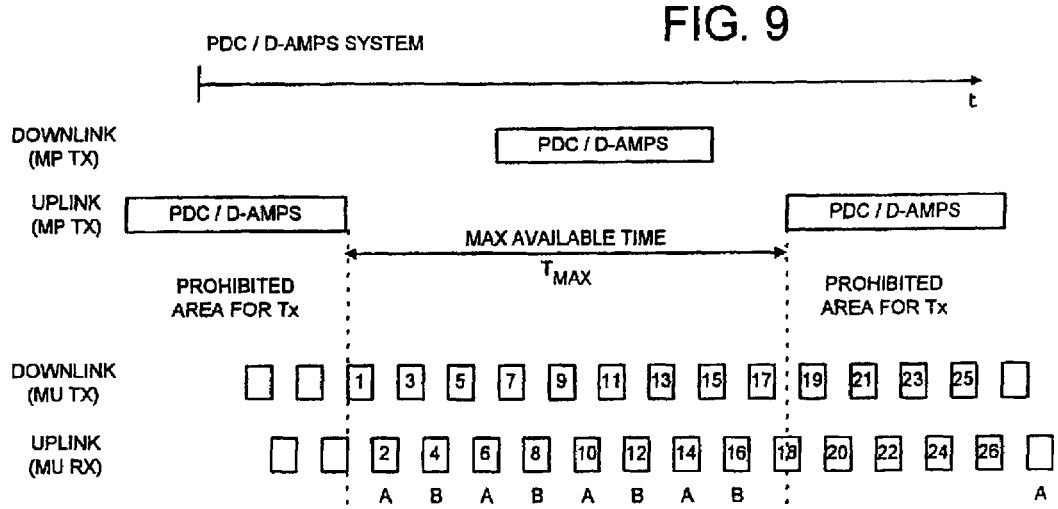
FIG. 9 illustrates the allocation of LPRF time slots in an LPRF communications network integrated with a PDC or D-AMPS mobile communications network.

Referring to FIG. 9, another allocation pattern made by the controller 60 is illustrated. The mobile network is a PDC or D-AMPS network and the number of LPRF time slots per GSM time frame is 26 labelled 1 to 26 in the Figure. Transmission (down-link, D) in the LPRF network by the mobile terminal during slots 18 to 26 is forbidden. In this allocation pattern, the mobile terminal is able to transmit and receive in the LPRF network slots 1 to 17 and to receive only in slots 18 to 26.

Figure 10:
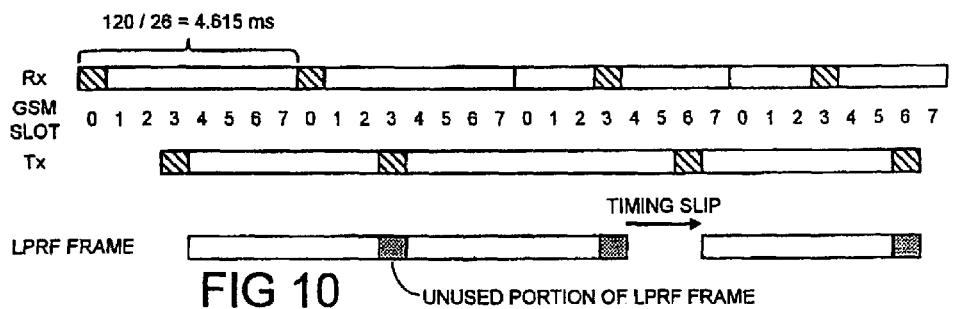
FIG. 10 illustrates how the common time frame of the LPRF communications system can be shifted.

FIG. 10 illustrates how the LPRF timing readjust to a change in the timing of the mobile network. In this example the mobile time slot in which the mobile terminal transmits in the mobile network changes from slot 3 to slot 6. This may occur for example when the mobile terminal is handed over by one base station to another in the mobile network. The resynchronisation of mobile and LPRF networks is achieved by the cellular circuitry 62 informing the control unit 80 which in turn changes the timing of the master transceiver 40 in the mobile terminal 100. The super-frame is shifted by an integer number of LPRF time slots but the allocation pattern within the super-frame remains unchanged and shifts with the super-frame.

Although a particular implementation of the invention has been described it should be appreciated that the implementation may be varied without departing from the scope of the invention as defined by the claims. In particular the invention is not limited to the particular mobile networks and LPRF network described nor are the allocation patterns limited to the patterns described.

The invention claimed is:

1. A terminal comprising:
    first radio transceiver means for transmitting and receiving in a first mobile communications network and arranged such that successive transmissions by said first transceiver means in said first mobile communications network are separated by a first period of time; and
    second radio transceiver means for transmitting and receiving packets in the second radio communications network, arranged for transmitting and/or receiving an integer number of packets sequentially in the first period of time wherein the first radio transceiver is operable;
    to transmit in the first mobile radio communications network while at the same time, the second radio transceiver is operable to receive in the second radio communications network; and/or
    the first radio transceiver is operable to receive in the first mobile radio communications network while, at the same time, the second radio transceiver is operable to transmit or receive in the second radio communications network.

2. A terminal as claimed in claim 1, wherein the second transceiver means controls the second communications network by defining allocation patterns for transmission and/or reception of packets in the second communications network.

3. A terminal as claimed in claim 2, wherein said allocation patterns controls the timing of transmissions of packets within the second communications network.

4. A terminal as claimed in claim 3, wherein said allocation patterns controls at what time transceiver units in the second communications network are given access to the network, whether that access is for transmission or reception and the duration of that access.

5. A terminal as claimed in claim 2, wherein said allocation patterns avoid predetermined concurrent activities at the terminal.

6. A terminal as claimed in claim 5, wherein said allocation patterns avoids or prevents transmission of packets in the second communication network by the second transceiver means while said first transceiver means is transmitting in the first communications network.

7. A terminal as claimed in claim 2, wherein said allocation patterns allows the transmission of packets in the second communication network by the second transceiver means only when the first transceiver means is not transmitting in the first communications network.

8. A terminal as claimed in claim 2, wherein said allocation patterns have a finite length, equal to said first period of time or a multiple thereof, and is cyclically repeated.

9. A terminal as claimed in claim 8 wherein said length of the allocation patterns are variable, being controlled by said second transceiver means.

10. A terminal as claimed in claim 2, wherein said allocation patterns are variable being controlled by said second transceiver means.

11. A terminal as claimed in claim 1, wherein the second radio transceiver means is a TDMA transceiver and said first period of time corresponds to a TDMA frame.

12. A terminal as claimed in claim 1, wherein the second radio transceiver defines a common time frame used in the second radio communications network.

13. A terminal as claimed in claim 12, wherein the common time frame comprises a series of slots having the same length, wherein at most one packet is transmitted in the second communications network during each slot.

14. A terminal as claimed in claim 13, wherein the length of the slot is such that a first integer number of slots correspond to the first period of time.

15. A terminal as claimed in claim 14 wherein said first integer number of slots is an even number of slots.

16. A terminal as claimed in claim 14, wherein said first integer number of slots is minimum but greater than one.

17. A terminal as claimed in claim 13, wherein the length of a slot is such that a second integer number of slots correspond to a second period of time, representing the period of time between successive transmissions in a third mobile radio communications network.

18. A terminal as claimed in claim 17 wherein said second integer number of slots is an even number of slots.

19. A terminal as claimed in claim 18 wherein said second integer number of slots is minimum but greater than one.

20. A terminal as claimed in claim 17, wherein the length of the slot is variable depending on the first and/or third communication systems.

21. A terminal as claimed in claim 13, wherein the length of the slot is fixed.

22. A terminal as claimed in claim 1, wherein the second transceiver means controls the second communications network such that the frequency at which packets are transmitted therein hops with successive slots.

23. A terminal as claimed in claim 11, comprising means for shifting the common time frame to maintain synchronisation with its activities in the first communications network.

24. A terminal as claimed in claim 1, wherein said first transceiver means is adapted for use in a TDMA system wherein the first period of time corresponds to the length of a TDMA frame.

25. A terminal as claimed in claim 24, wherein said first transceiver means is adapted for use in a GSM, D-AMPS or PDC network.

26. A terminal as claimed in claim 1, wherein each transmission by the first transceiver means does not exceed a predetermined duration.

27. A terminal comprising:
   first radio transceiver means for transmitting and receiving in a first mobile communications network and arranged such that successive transmissions by said first transceiver means in said first mobile communications network are separated by a first period of time; and
   second radio transceiver means for transmitting and receiving packets in the second radio communications network, arranged for transmitting and/or receiving an integer number of packets sequentially in the first period of time, the second transceiver means controlling the second communications network by defining allocation patterns for transmission and/or reception of packets in the second communications network wherein the first radio transceiver is operable;
   to transmit in the first mobile radio communications network while, at the same time, the second radio transceiver is operable to receive in the second radio communications network; and/or
   the first radio transceiver is operable to receive in the first mobile radio communications network while, at the same time, the second radio transceiver is operable to transmit or receive in the second radio communications network.

28. A terminal as claimed in claim 27 wherein said allocation patterns avoids or prevents transmission of packets in the second communication network by the second transceiver means while said first transceiver means is transmitting in the first communications network; and
   wherein said allocation patterns allows the transmission of packets in the second communication network by the second transceiver means only when the first transceiver means is not transmitting in the first communication network.

29. A terminal, comprising:
   first radio transceiver means for transmitting and receiving in a first mobile communications network and arranged such that successive transmissions by said first transceiver means in said first mobile communications network are separated by a first period of time; and
   second radio transceiver means for transmitting and receiving packets in a second radio communications network, arranged for transmitting and/or receiving an integer number of packets sequentially in the first period of time wherein the terminal schedules a time for transmission in the first mobile radio communications network and allocates time slots, wholly or partly contemporaneous with the time for transmission in the first mobile radio communications network, for reception in the second mobile radio communications network.

30. A method of controlling a terminal comprising:
   scheduling a time for transmission in a first mobile radio communications network such that successive transmissions are separated by a first period of time; and
   allocating time slots for transmitting and receiving packets in a second radio communications network such that an integer number of packets are received sequentially in the first period of time; and
   wherein the time slots for receiving in the second radio communications network are wholly or partly contemporaneous with the time for transmission in the first mobile radio communications network.

* * * * *